(12) United States Patent
Urabe et al.

(10) Patent No.: US 7,363,235 B2
(45) Date of Patent: Apr. 22, 2008

(54) IMAGE STORING APPARATUS AND IMAGE STORING PROGRAM

(75) Inventors: Hitoshi Urabe, Tokyo (JP); Katsuo Ogura, Tokyo (JP); Naoki Ishikawa, Tokyo (JP); Makoto Hara, Kanagawa (JP); Hideki Morikawa, Tokyo (JP); Kazuo Shiota, Tokyo (JP); Shuichi Otsuka, Kanagawa (JP); Yoshiki Kawaoka, Asaka (JP)

(73) Assignee: Fujifilm Corporation, Tokyo (JP)

( * ) Notice: Subject to any disclaimer, the term of this patent is extended or adjusted under 35 U.S.C. 154(b) by 1202 days.

(21) Appl. No.: 10/076,113

(22) Filed: Feb. 15, 2002

(65) Prior Publication Data

US 2002/0140978 A1  Oct. 3, 2002

(30) Foreign Application Priority Data

Feb. 16, 2001 (JP) ............................. 2001-040788
Aug. 3, 2001 (JP) ............................. 2001-236363

(51) Int. Cl.
*G06F 17/60* (2006.01)

(52) U.S. Cl. ....................................................... 705/1

(58) Field of Classification Search .................... 705/1; 396/6; 345/838
See application file for complete search history.

(56) References Cited

U.S. PATENT DOCUMENTS

| 6,583,799 B1 * | 6/2003 | Manolis et al. ............. 715/838 |
| 6,786,655 B2 * | 9/2004 | Cook et al. ................. 396/569 |
| 2002/0105658 A1 * | 8/2002 | Jackson et al. ............. 358/1.2 |

\* cited by examiner

*Primary Examiner*—John Weiss
*Assistant Examiner*—Matthew S. Meyers
(74) *Attorney, Agent, or Firm*—Birch, Stewart, Kolasch & Birch, LLP

(57) ABSTRACT

The image storing apparatus stores an image uploaded from a customer via a network on a large-capacity medium by associating it with customer information indicating the customer, image attribute information or image selection information so as to manage the image of the customer. And if capacity, quantity, a recording period or a current date of the images of a certain customer exceeds a predetermined threshold, one image or a plurality of images of the customer are moved to another medium so as to secure storage capacity of the above described large-capacity medium.

42 Claims, 15 Drawing Sheets

FIG.6

| REF. NO. | CUSTOMER ID | IMAGE ID | CAPACITY | UPDATE TIME AND DATE |
|---|---|---|---|---|
| 1 | XXXX | | | |
| 2 | YYYY | | | |
| 3 | ZZZZ | | | |
| ... | ... | | | |

FIG.8

IMAGE ATTRIBUTE INFORMATION

| CUSTOMER ID | IMAGE ID | SHARED | PHOTOGRAPHING TIME AND DATE | TITLE | PHOTOGRAPHING LOCATION | OTHER |
|---|---|---|---|---|---|---|

FIG.9

| NO. | CUSTOMER ID | IMAGE ID | SIZE | UPDATE TIME AND DATE | SELECTION | IMAGE ATTRIBUTE INFORMATION | OTHER | CUSTOMER INFORMATION |
|---|---|---|---|---|---|---|---|---|
| 1 | xxxx | aaaa | | | YES | | | |
| 2 | | aaab | | | NO | | | |
| 3 | yyyy | pppp | | | YES | | | |
| 4 | · | | | | | | | |
| 5 | · | | | | | | | |
| · | · | | | | | | | |
| · | · | | | | | | | |
| · | · | | | | | | | |

FIG.11

| CATEGORY | REF. NO. | CUSTOMER ID | IMAGE ID |
|---|---|---|---|
| CELESTIAL BODY | 0011 | KKKK | dddd |
| | 0015 | LLLL | wwww |
| | 0020 | MMMM | ssss |
| | | | |
| TRAVEL | 0009 | JKJK | qqqq |
| | 0014 | SRSR | iiii |
| | | | |
| TENNIS | 0007 | TRTR | eeee |
| | | | |
| | | | |
| | | | |

FIG.12

| REF. NO. | CUSTOMER ID | NAME | GENDER | DATE OF BIRTH | AGE | ADDRESS | RELEASE | OTHER |
|---|---|---|---|---|---|---|---|---|
| 1 | XXXX | | MALE | | 30 | | OK | |
| 2 | YYYY | | FEMALE | | 25 | | OK | |
| 3 | SSSS | | MALE | | 40 | | OK | |
| 4 ... | ... | | | | | | ... | |

FIG.13

| REF. NO. | CUSTOMER ID | POINT COUNT STARTING DATE | ACCUMULATED POINTS |
|---|---|---|---|
| 1 | XXXX | 2001/01/01 | 10 |
| 2 | YYYY | 2001/01/01 | 15 |
| 3 | ZZZZ | 2001/01/01 | 20 |
| ... | ... | | |

IMAGE STORING APPARATUS AND IMAGE STORING PROGRAM

BACKGROUND OF THE INVENTION

1. Field of the Invention

The present invention relates to an image storing apparatus, an image storing system, a terminal unit, an image storing program and an image storing method suited to storing images uploaded from a customer by using a network.

2. Description of the Related Art

In the past, it was common to record images of a background, a person, etc. on silver-halide photographs whenever there were various events and incidents. However, it often happens that the silver-halide photographs taken and developed end up stored in an album in disorder since it takes time and effort to arrange them. Thus, there was a problem that it took time to look for a necessary photograph when necessary.

In addition, the album for storing the silver-halide photographs requires a place for storing. There was also a problem, however, that the album becomes bulky as the silver-halide photographs increase, and there are so many silver-halide photographs that it becomes impossible to secure the place for storing the album.

Furthermore, there was also a problem that, in case of an emergency such as a natural disaster, negatives and the silver-halide photographs get lost or extra prints thereof cannot be made, even if so desired, since the negatives cannot be found.

On the other hand, in recent years, a network technology using computers has been developed to such an extent that a service of uploading personal image data to an image storing apparatus (image storing server) and storing it thereon. For instance, this type of image storing server sends a banner advertisement and so on to a customer having registered the image and displays it on the customer-side personal computer, and acquires advertisement distribution fees from an advertiser requesting distribution of the advertisement, and is managed thereby.

However, as there is a limit to recording capacity of the recording device of the server managing and storing the images, there are many cases where a restriction is provided, such as the image recording capacity per customer to be within 50 MB.

As the image exceeding the limit capacity cannot be newly recorded, the customer needed to provide an instruction for recording a new image after deleting the image already recorded.

There was a problem that the work of looking for the image to be deleted and deleting it from the image storing server is very troublesome for the customer and there is a possibility that the customer may mistakenly delete the image not to be deleted. In addition, from the viewpoint of managing and arranging personal images, arrangement is not easy if there are a large number of images stored on the server.

SUMMARY OF THE INVENTION

The present invention has been implemented in consideration of such circumstances, and its object is to provide an image storing apparatus, an image storing system, a terminal unit, an image storing program and an image storing method for storing a large number of images so as to easily handle them without taking time and effort.

In order to attain the above object, the present invention is directed to an image storing apparatus, comprising: an image capturing device which captures an image; an image storing device which stores the image captured by the image capturing device; a customer information storing device which stores customer information; a receiving device which receives image selection information indicating that the image to be stored is selected; and an image management information storing device which stores image management information associating the image stored in the image storing device and indicated by the image selection information received by the receiving device with the customer information stored in the customer information storing device.

Preferably, the receiving device receives image attribute information indicating an attribute of the image as one piece of the image selection information; and the image management information storing device stores the image stored in the image storing device and indicated by the image attribute information received by the receiving device by associating the image with the image attribute information and the customer information stored in the customer information storing device.

The image storing apparatus according to another embodiment further comprises: an image storing period measuring device which measures a storing period of the image; and a notifying device which, when the storing period measured by the image storing period measuring device passes a predetermined period, notifies the customer of the image so as to prompt input of one of the image selection information and image attribute information.

Preferably, when the receiving device receives none of the image selection information and the image attribute information within the predetermined period from the notification, the image storing device deletes the image which is a subject of the notification.

As it is not efficient to keep storing all the images permanently, the predetermined period of storing is provided. And when there is no information to the effect of storing the image even after the storing period of the image elapsed, it notifies the customer so as to prompt the input of the image selection information or image attribute information. It is thereby possible for the customer to always determine whether or not to store it at discretion even if the input of the image selection information or image attribute information has been forgotten. Accordingly, when no image selection information is received or no image attribute information is received within the predetermined period from the notification, it is thinkable that the customer has no intention of storing the image so that it can delete the image from the image storing device so as to render a database more efficient.

Moreover, it is also possible to consider that the image attribute information is the image selection information. It is because, as the image attribute information is used to search and classify the images, the customer supposedly intends to store the image which is the subject of the image attribute information as of the time when he or she sends the information. Thus, the image storing device deletes the image which is the subject of the notification not only when no image selection information is received but also when no image attribute information is received within the predetermined period from the notification.

The present invention is also directed to an image storing system, comprising: a plurality of terminal units, each of which comprises: an image selecting device which selects the image to be stored; and a sending device which sends the image selected by the image selecting device and image selection information indicating the image; and an image storing apparatus comprising: an image capturing device which captures the image sent from the terminal unit; an image storing device which stores the image captured by the image capturing device; a customer information storing device which stores customer information; a receiving device which receives image selection information sent from the terminal unit; and an image management information storing device which stores image management information associating the image stored in the image storing device and indicated by image selection information received by the receiving device with the customer information stored in the customer information storing device.

The plurality of terminal units and the image storing apparatus are connected via the network. The network referred to here means a communication network such as the Internet using a telephone line, an ISDN (Integrated Services Digital Network) and so on, which is also applicable to a power line, a cable television program circuit, an LAN (Local Area Network) and so on, for instance. While the terminal unit should desirably be a so-called personal computer, an image forming apparatus for reading the image recorded on a film and printing a photograph is also applicable. Moreover, in the latter case, the terminal unit just has to send the image read from the film to the image storing apparatus.

On the other hand, in the image storing apparatus, the image storing device once stores all the images captured by the image capturing device. The customer information storing device stores the customer information usable for searching and classifying the customers. Moreover, the image storing device may be comprised of either one database or a plurality of databases. And the image management information storing device associates the image stored in the image storing device and indicated by the image selection information with the customer information stored in the customer information storing device and then stores the image management information generated by this association. Here, the image storing device and the image management information storing device may be on the same server or on different servers. As a result thereof, the image to be stored is associated with the customer information so that the image to be stored can be easily searched for.

Preferably, the sending device of the terminal unit sends image attribute information indicating an attribute of the image as one piece of the image selection information; the receiving device of the image storing apparatus receives the image attribute information from the terminal unit as one piece of the image selection information; and the image management information storing device of the image storing apparatus stores the image stored in the image storing device and indicated by the image attribute information received by the receiving device by associating the image with the image attribute information and the customer information stored in the customer information storing device.

The image attribute information is used to search and classify the images, and the information directly inputted by the customer and the information recorded with the image on a record medium are applicable thereto. For instance, in the latter case, the information on photographing recorded on the record medium with the image when the image was photographed with a digital camera is desirable. Thus, it is possible, by storing the image management information by associating it with the image attribute information, to search and classify the images in further detail.

The present invention is also directed to a terminal unit, comprising: an image selecting device which selects an image to be stored; and a sending device which sends the image selected by the image selecting device and image selection information indicating the image.

The terminal unit sends the image and the image selection information so that the image management information wherein these are associated is formed. Thus, the images to be stored and those not to be stored are distinguished so as to render the database more efficient.

The present invention is also directed to an image storing apparatus having a recording device which records an image uploaded from a customer side, the apparatus comprising: a receiving device which receives the image from a communication apparatus on the customer side; a recording device which records the received image; a determining device which determines whether or not to move the image recorded on the recording device to a record medium by comparing at least one of the capacity, quantity, recording period and a current date thereof recorded on the recording device to corresponding at least one of predetermined thresholds; and a moving device which moves the image recorded on the recording device to the record medium based on results of the determination.

The present invention has the receiving device which receives the image from the communication apparatus on the customer side, the recording device which records the received image within the predetermined limit capacity, the determining device which determines whether or not to move the image recorded on the recording device to the recording medium by comparing the capacity, quantity, recording period or the current date thereof to the predetermined thresholds, and the moving device which moves to the record medium the image recorded on the recording device based on the results of the determination, so that it is possible to prevent disappearance of the image due to a wrong operation and easily manage and arrange the images.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 6 is a diagram showing the configuration of image basic information in the image storing database;

FIG. 8 is a diagram showing the configuration of the image attribute information;

FIG. 9 is a diagram showing the configuration of the image information storing database;

FIG. 11 is a diagram showing the configuration of a shared image management database;

FIG. 12 is a diagram showing the configuration of the customer management database created by extracting the customers whose "release" of customer information is "OK";

FIG. 13 is a diagram showing the configuration of a point management database;

DETAILED DESCRIPTION OF THE PREFERRED EMBODIMENTS

Hereafter, preferred embodiments of an image storing apparatus, an image storing system, a terminal unit, an image storing program and an image storing method according to the present invention will be described in detail according to the attached drawings.

Figure 1:
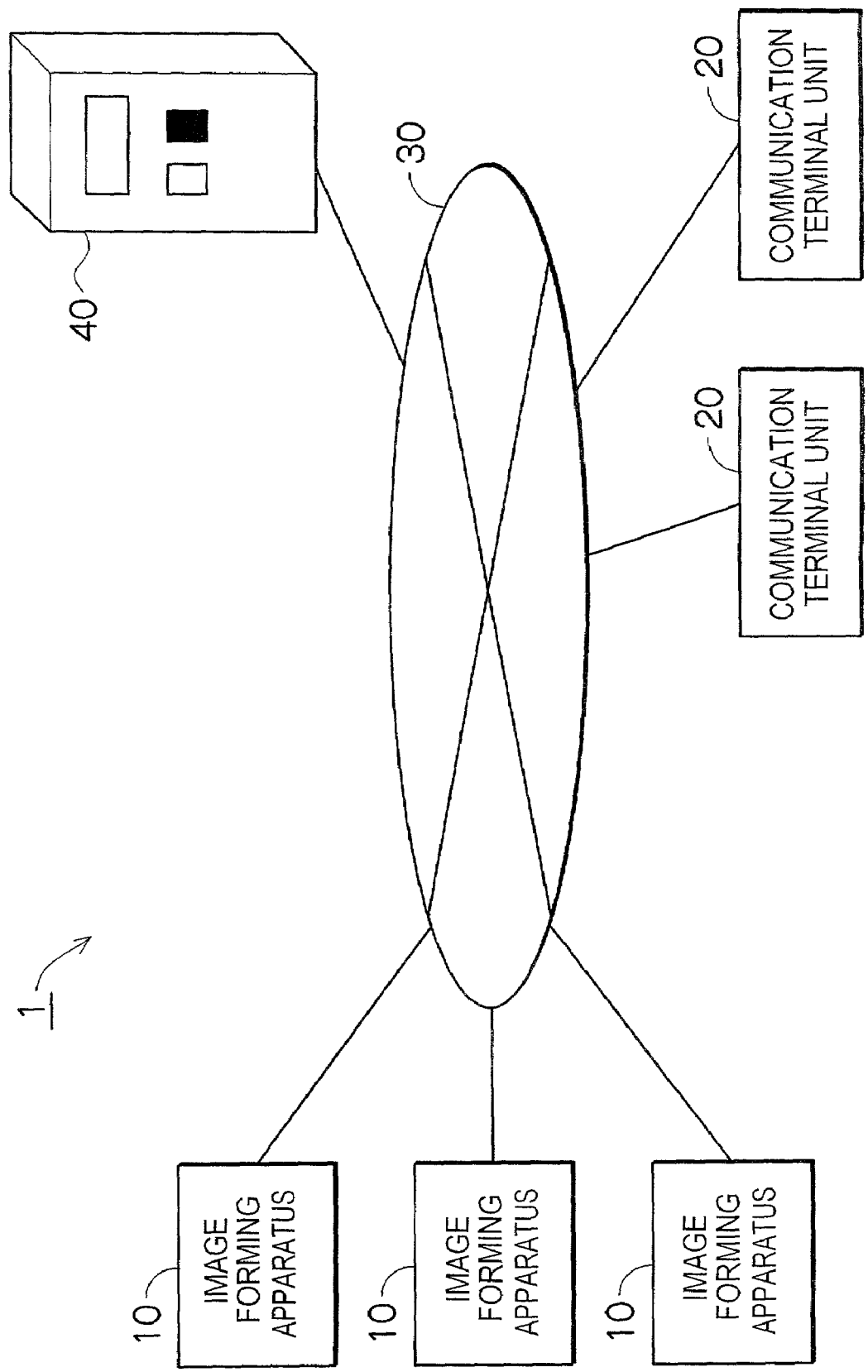
FIG. 1 is a diagram showing a configuration of an image storing system according to an embodiment of the present invention.

As shown in FIG. 1, an image storing system 1 according to an embodiment of the present invention has a plurality of image forming apparatuses 10 to be installed in so-called mini-lab stores, a plurality of communication terminal units 20 used by general customers, and an image storing server 40 for storing and managing an image sent via the Internet 30. The communication terminal units 20 and the image forming apparatuses 10 are connected to the image storing server 40 via the Internet 30, and are capable of sending and receiving various kinds of information by mutual communication to and from the image storing server 40.

Moreover, in this embodiment, while a centralized system wherein the image storing server 40 performs processing to the image forming apparatuses 10 and the communication terminal units 20 in a centralized fashion will be described as an example, it is also applicable to a decentralized system comprised of a plurality of servers.

The image forming apparatus 10 is installed in the mini-lab store, and is capable of not only reading an image recorded on a film and printing a photograph but also registering a print image with the image storing server 40.

Figure 2:
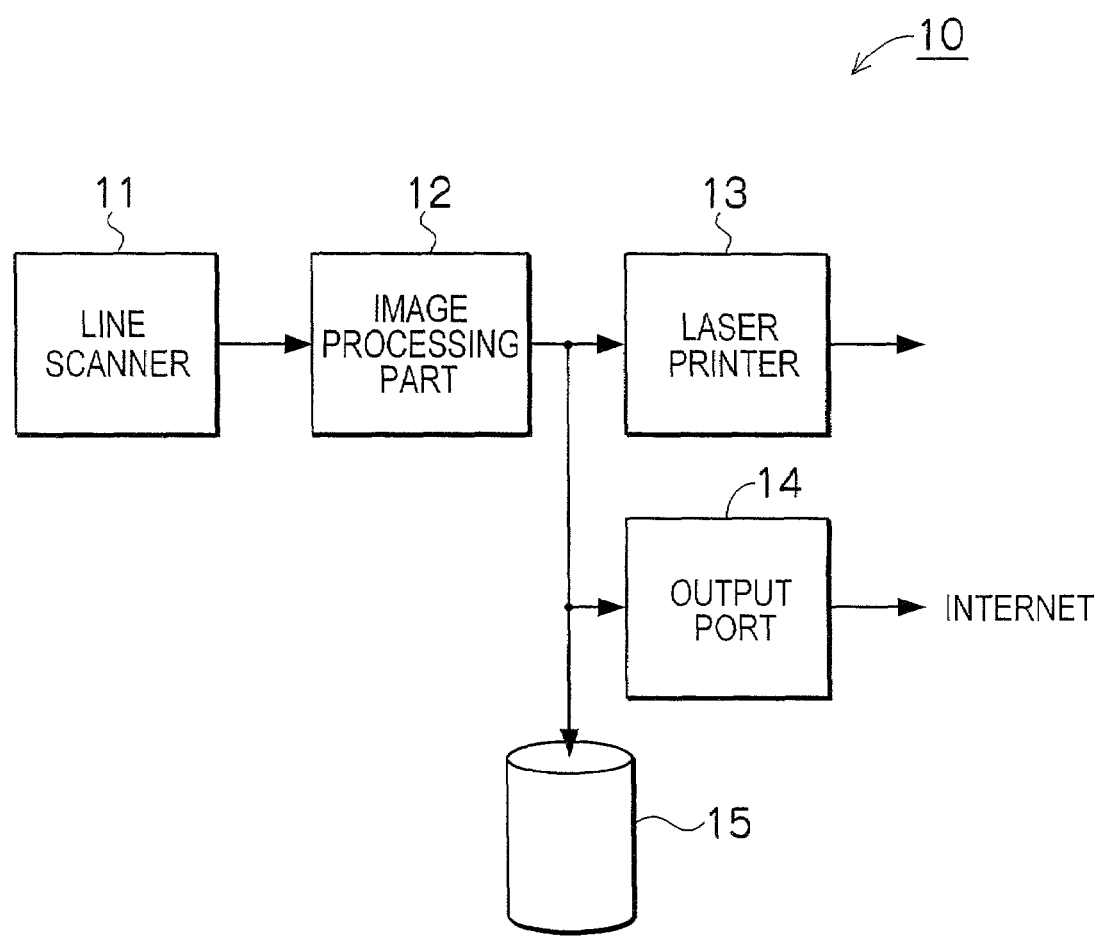
FIG. 2 is a block diagram showing the configuration of an image forming apparatus of the image storing system.

To be more specific, as shown in FIG. 2, the image forming apparatus 10 has a line scanner 11 for reading a film image and outputting image data, an image processing division 12 for performing a predetermined correction process and so on to the image data from the line scanner 11, a laser printer division 13 for recording the image on photographic paper based on the image data from the image processing division 12, an output port 14 for sending onto the Internet 30 the image data outputted by the image processing division 12, and a hard disk drive 15 for storing all the image data obtained by the image processing division 12.

If a customer requests the mini-lab store to develop the film and store the print image, the image forming apparatus 10 sends the image data used for development to the image storing server 40 via the Internet 30. In addition, the image forming apparatus 10 has the hard disk drive 15 for storing all the image data obtained by the image processing division 12, and so it also has a function of an image storing database mentioned later.

Moreover, in the image storing system 1, the customer cannot store the image on the image storing server 40 unless customer information is sent thereto to perform customer registration. Here, while it is desirable to send the customer information together with or prior to sending of the image, it is also possible to send it thereafter.

The communication terminal unit 20 is comprised of a so-called personal computer capable of connecting to the Internet 30, for instance. The communication terminal unit 20 is used, for instance, when the customer stores the image photographed with a digital camera on the image storing server 40 in person, registers the customer's own information (customer information) therewith or browses the image stored thereon. Moreover, the communication terminal unit 20 may also be a special purpose terminal to be connected to the image storing server 40 via a dedicated line or a portable telephone.

Figure 3:
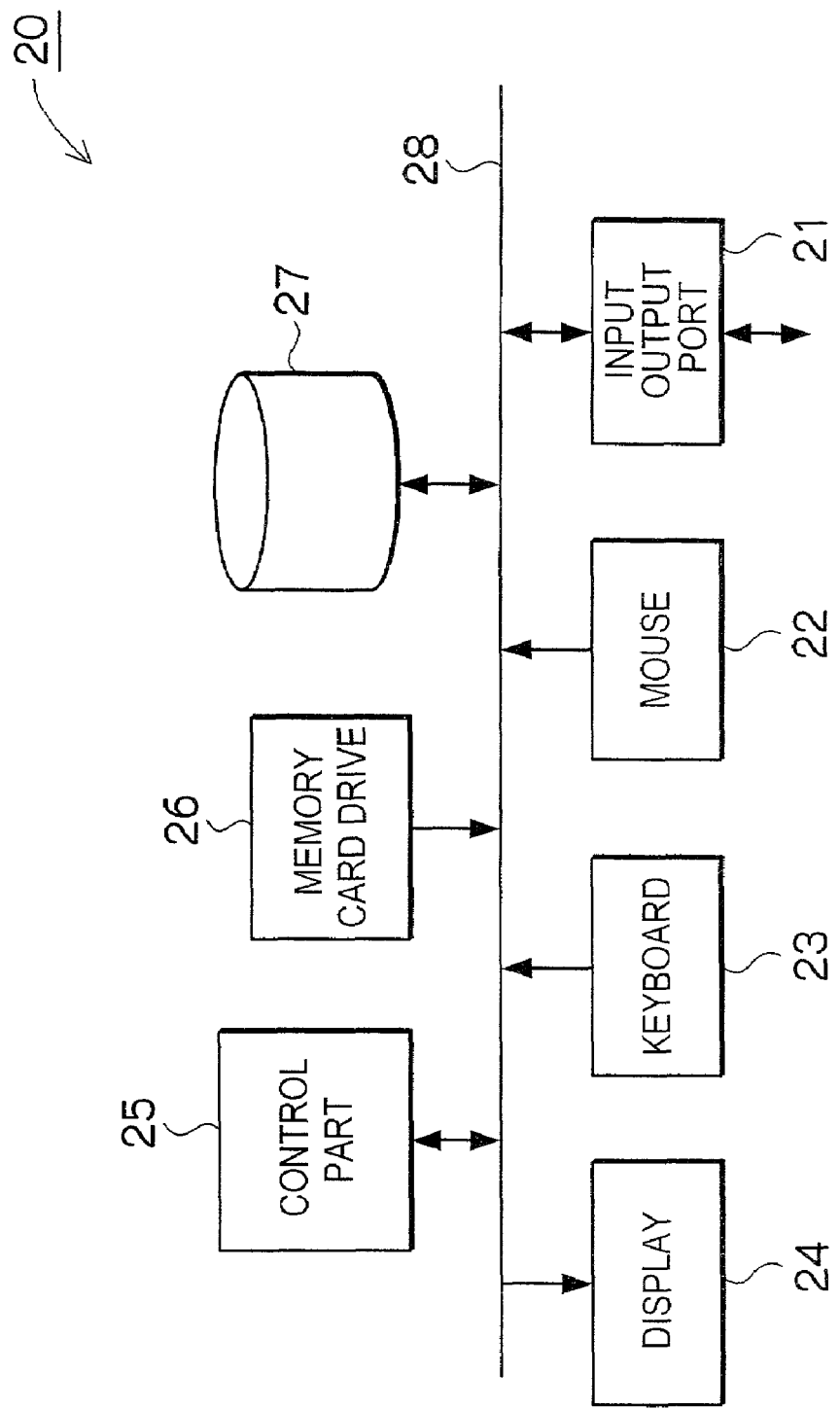
FIG. 3 is a block diagram showing the configuration of a communication terminal unit of the image storing system.

To be more specific, as shown in FIG. 3, the communication terminal unit 20 has an input-output port 21 where the data is inputted and outputted via the Internet 30, a mouse 22 which is a pointing device, a keyboard 23 for inputting numerical values, characters and so on, a display 24 for displaying input results and so on, a control division 25 for controlling overall operation, a memory card drive 26 for reading the image recorded on a memory card, a hard disk drive 27 for storing the data, and a bus 28 for connecting the divisions.

The mouse 22 is used when selecting the image displayed on a Web site or specifying a position for inputting a character. The keyboard 23 is used when inputting the customer information, image attribute information, image selection information and so on. Moreover, it is also possible to use a dedicated input unit having a function of the pointing device and a function of inputting the numerical values, characters and so on instead of the mouse 22 and the keyboard 23.

As for the display 24, it is possible to apply a liquid crystal display, a cathode ray tube display, an EL (Electro Luminescence) display, a plasma display or a television receiver, for instance. Furthermore, it is also possible to use a so-called touch panel having the functions of the mouse 22, the keyboard 23 and the display 24. The control division 25 sends, for instance, the customer information, image selection information and image attribute information inputted from the mouse 22 and the keyboard 23, and furthermore the image data read by the memory card drive 26 to the image storing server 40 via the input-output port 21. The control division 25 can also display the image on the display 24 based on the data from the image storing server 40.

The image storing server 40 once stores all the images sent from the image forming apparatuses 10 and the communication terminal units 20, and further associates them with the customer information and the image attribute information so as to arrange, classify and store them. And the image storing server 40 can put a stored image on the Web site, send predetermined data based on an instruction of the communication terminal units 20, and place an order for the print of the stored image with a predetermined mini-lab store.

Figure 4:
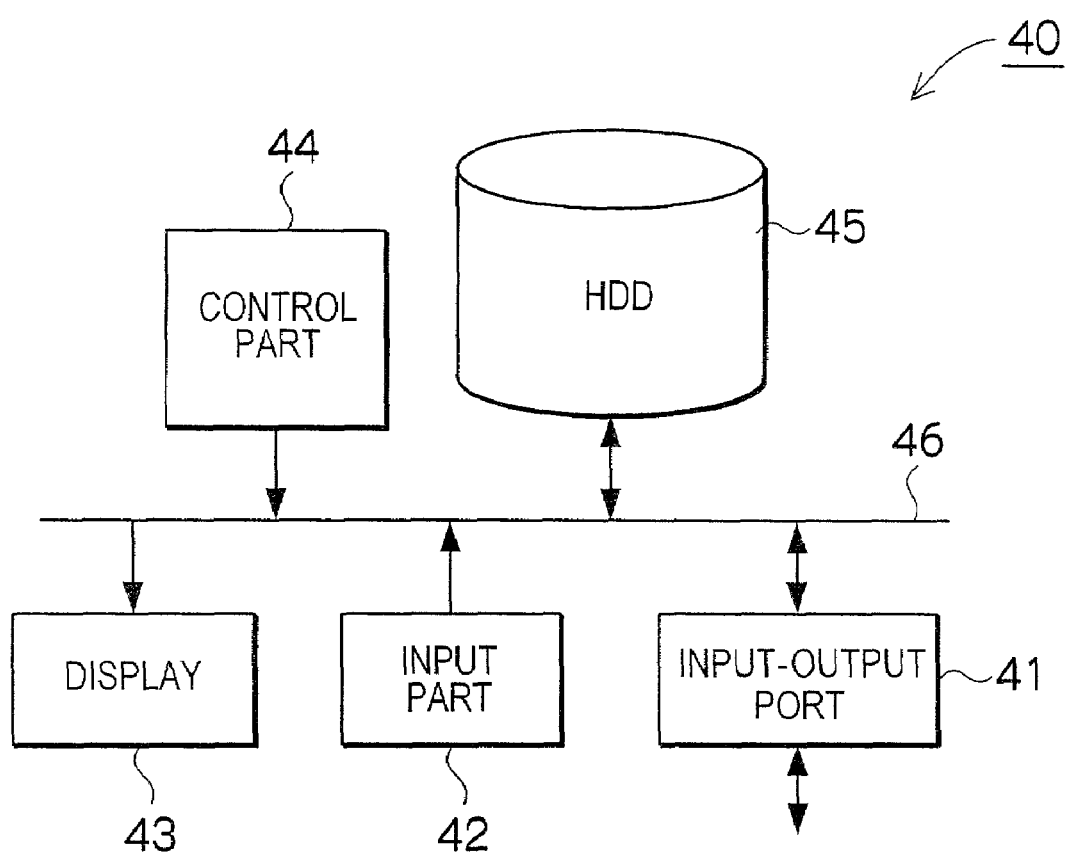
FIG. 4 is a block diagram showing the configuration of an image storing server of the image storing system.

To be more specific, as shown in FIG. 4, the image storing server 40 has an input-output port 41 where the data is inputted and outputted via the Internet 30, an input division 42 comprised of the mouse, the keyboard and so on, a display 43 for displaying the input results and so on, a control division 44 for controlling the overall operation, a hard disk drive 45 for storing various databases, programs and so on, and a bus 46 for mutually connecting the divisions.

The control division 44 performs, for instance, such functions as issuing a customer ID (Identification) and a password upon receipt of new customer information, associating the images stored on the hard disk drive 45 with various kinds of information and classifying the images. In addition, the control division 44 has a clock function of timing the current time and date.

The hard disk drive 45 can store large-capacity data so as to once store all the images from the image forming apparatuses 10 and the communication terminal units 20.

Figure 5:
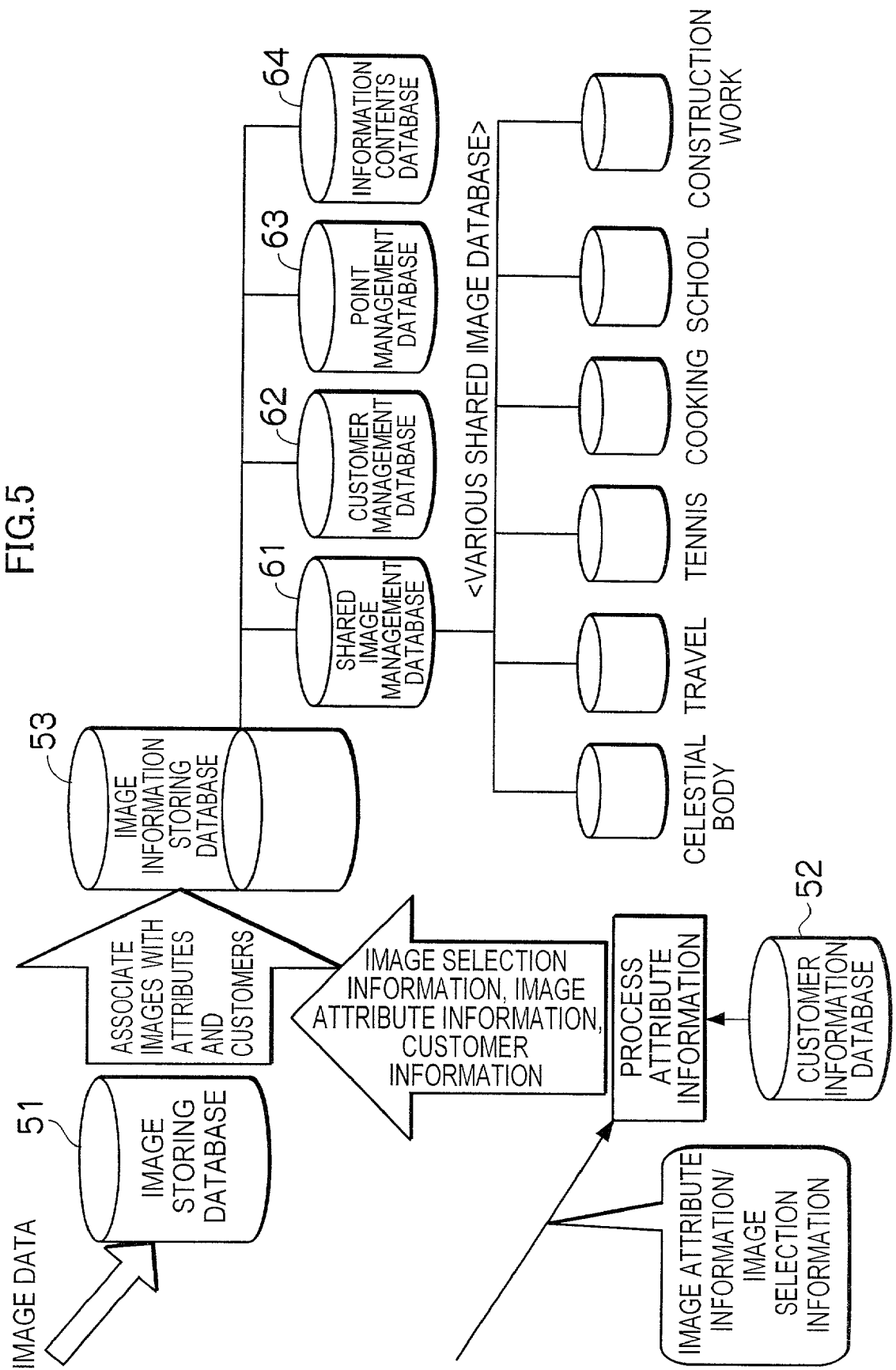
FIG. 5 is a diagram explaining a relationship among an image storing database, a customer information database and an image information storing database in the image storing server.

As shown in FIG. 5, the hard disk drive 45 has an image storing database 51 having the images merely sent from the image forming apparatuses 10 and the communication terminal units 20, a customer information database 52 comprised of many pieces of customer information, and an image information storing database 53 formed by associating the image storing database 51 with the customer information database 52 and so on.

The image storing database 51 is comprised of a plurality of images sent from the image forming apparatuses 10 and the communication terminal units 20 and image basic information which is basic information on sizes and so on of these images. Accordingly, if the image forming apparatuses 10 or the communication terminal units 20 sends a new image, the image storing database 51 is updated.

As shown in FIG. 6, the image basic information is comprised of the customer ID, an image ID, the size and update time and date. The customer ID is an identification symbol for identifying the customer who sent the image. The image ID is uniquely determined for the sent image, and is used to identify the image. The size is data capacity of the image. The update time and date indicate the time and date when the image was updated last.

Figure 7:
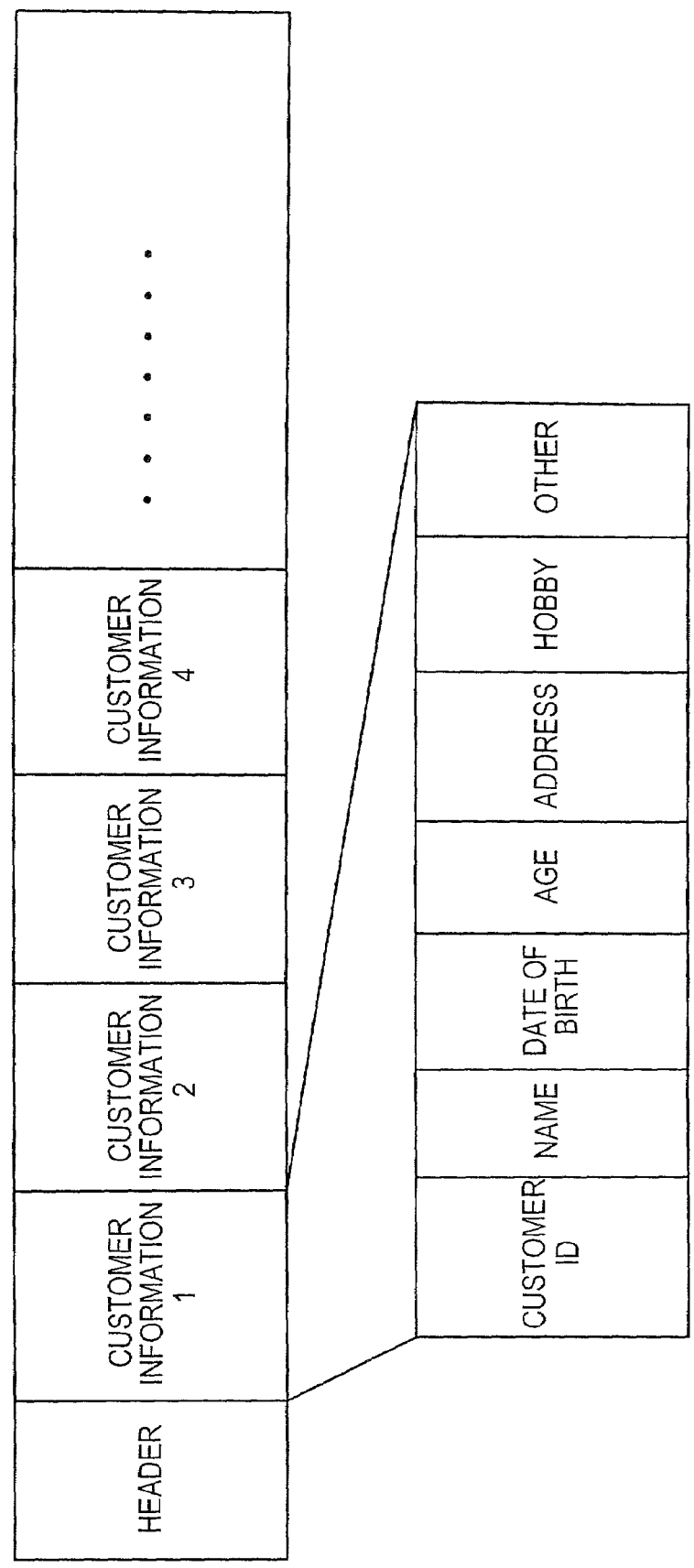
FIG. 7 is a diagram showing the configuration of the customer information database.

As shown in FIG. 7, the customer information database 52 is comprised of customer information 1, 2, ... sent from the image forming apparatuses 10 and the communication terminal units 20, and header information for managing each piece of the customer information. Accordingly, if there is new customer registration, the customer information database 52 is updated. To be more specific, each piece of the customer information is comprised of the customer ID, a name, a date of birth, age, an address, a hobby and other information.

The image information storing database 53 stores not only the above-mentioned image attribution information on the association between the image storing database 51 and the customer information database 52 but also the image storing information further associating the image attribute information with the image selection information.

Here, the image attribute information is an image data attribute, that is, detailed information on the image data, and as shown in FIG. 8, it is comprised of the customer ID, the image ID, sharing, photographing time and date, a title, a photographing location and other information. The "sharing" is the information indicating whether or not the image is shared with a third party, that is, whether or not it can also be read by a third party.

Moreover, the image attribute information may be the information recorded on the memory card together with the image by the digital camera. In this case, the digital camera can also record the information on the photographing location included in the image attribute information if it has a GPS (Global Positioning Systems) receiver. Accordingly, the communication terminal units 20 may send the image attribute information recorded on the memory card by the digital camera to the image storing server 40 in addition to sending the image attribute information inputted from the keyboard 23 thereto as mentioned above.

The image selection information is a signal (information) generated when the customer selects the image to be stored, and identifies the image to be stored.

As shown in FIG. 9, the image information storing database 53 is comprised of the customer ID, the image ID, the size, the update time and date, selection, the image attribute information, the customer information and other information. Here, the "selection" becomes "Yes" when the image storing server 40 receives the image selection information, and becomes "No" when it receives no image selection information. Moreover, Yes/No of the selection may be changed at any time.

And if accessed by the customer via the communication terminal units 20, the image storing server 40 reads the image of the customer from inside the image information storing database 53 and sends it to the communication terminal units 20, and edits the images, cerates an album and orders the prints according to the customer's request.

Figure 10:
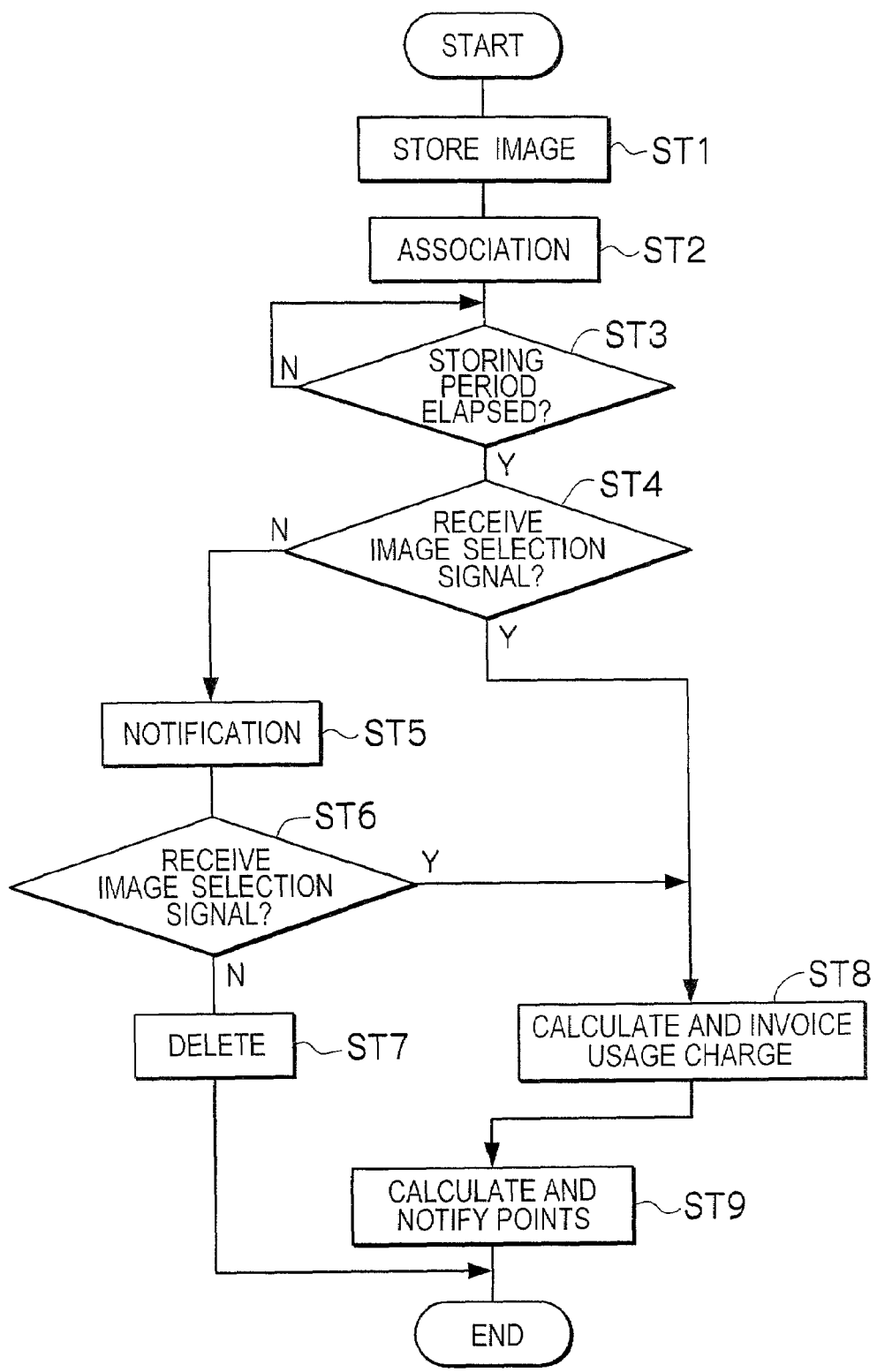
FIG. 10 is a flowchart explaining an operating procedure of the image storing server.

In the image storing system 1 constituted as above, if the image forming apparatuses 10 or the communication terminal units 20 sends a new image to the image storing server 40, the image storing server 40 performs a step ST1 and subsequent process shown in FIG. 10 in order to store the new image.

Moreover, in the step ST1 described on the assumption that the customer has finished the customer registration with the image storing server 40 and the customer has already logged in by using the customer ID and password, the image storing server 40 stores the image sent from the image forming apparatuses 10 or the communication terminal units 20 in the image storing database 51 and then moves on to a step ST2.

In the step ST2, the image storing server 40 associates the image newly sent from the image forming apparatuses 10 or the communication terminal units 20 with the image storing database 51, the image attribute information, the image selection information and the customer information database 52, and updates the image information storing database 53 so as to move on to a step ST3.

Moreover, the image storing server 40 may associate the image storing database 51 with the customer information database 52 even if it receives no image attribute information or image selection information. And the image storing server 40 just has to update the image information storing database 53 each time it receives the image attribute information and the image selection information.

In the step ST3, the image storing server 40 determines whether or not a storing period of the newly sent image passed a predetermined period, and stands by in the step ST3 until the storing period of the image passes the predetermined period, and moves on to a step ST4 on determining that it passed the predetermined period.

In the step ST4, the image storing server 40 determines whether or not the image selection information or the image attribute information indicating selection of the newly sent image (hereafter, referred to as "image selection information, etc.") was received, and moves on to a step ST8 on determining that the image selection information, etc. were received, and moves on to a step ST5 on determining that they were not received.

In the step ST5, the image storing server 40 sends a notice to the customer to prompt input of the image selection information or image attribute information, and moves on to a step ST6. Moreover, the notice may be given to the customer by e-mail or by mailing a predetermined document to an address described in the customer information.

In the step ST6, the image storing server 40 determines whether or not the image selection information, etc. have been received after a predetermined period elapsed from the notice to the customer, and moves on to a step ST8 on determining that they were received, and moves on to a step ST7 on determining that they were not received.

In the step ST7, the image storing server 40 deletes the image and the information related thereto from the image storing database 51 so as to finish processing as to the image. As a result of it, the image storing server 40 can store only the image which the customer intends to store.

In addition, the image storing server 40 may send the image to be deleted to a recorder not shown for recording it in a nonvolatile memory such as a CD-R (Compact Disc Recordable) or a flash memory or a printer not shown for printing it on a paper medium. It is thereby possible for the customer to visually check the image deleted from the image storing database 51.

In the step ST8, the image storing server 40 calculates a usage charge based on a using and storing area and the storing period of the image and notifies the customer thereof, and then moves on to a step ST9. Here, it is desirable to exclude a predetermined period (such as one month) from starting to store the image from the image storing period for calculating the usage charge. It is thereby possible to prompt a larger number of third parties to perform the customer registration. Moreover, the notice of the usage charge may be given to the customer by e-mail or by mailing the document specifying the charge to the address described in the customer information.

Moreover, in the case where the customer has not paid the usage charge even after the predetermined period elapsed from the notice of the usage charge, the image storing server 40 can prohibit the customer from accessing the image storing database 51 and the image information storing database 53 even if the customer normally logs in from the communication terminal units 20.

In the step ST9, the image storing server 40 calculates points based on the using and storing area and the storing period of the image, and notifies the customer of the current points wherein the points of this time are added to the points accumulated from the last time so as to finish processing as to the image. Moreover, the notice of the points may be given to the customer by e-mail or by mailing the document specifying the points to the address described in the customer information.

The points calculated here may be used as a part of the price when purchasing a product or may also be used as a part of the usage charge in the step ST8.

Furthermore, as shown in FIG. 5, the image information storing database 53 can have a configuration having a shared image management database 61, a customer management database 62, a point management database 63 and an information contents database 64.

The shared image management database 61 is the database wherein the images shareable with a third party are classified according to predetermined categories such as celestial body, travel, tennis, cooking, school and construction work.

The image storing server 40 first selects the image of which "sharing" comprising the image attribute information is "possible" in the image information storing database 53. Next, the image storing server 40 determines, from the selected images, whether or not information on the celestial body is described in the image attribute information, and selects the image wherein that information is described. Likewise, it determines whether or not information on travel is described in the image attribute information, and selects the image wherein that information is described. The image storing server 40 performs the same process hereafter so as to form the shared image management database 61 as shown in FIG. 11 for instance. The shared image management database 61 is comprised of categories, reference numbers, customer IDs and image IDs.

And when the third party accesses the image storing server 40 via the communication terminal unit 20, the image storing server 40 authorizes the third party's access and sends the images of the celestial body, for instance, to the communication terminal unit 20. Thus, the images of the celestial body, for instance, are displayed on the display 24 of the communication terminal unit 20. They can also be displayed likewise as to the other categories. Moreover, it is also possible to send the e-mail describing that such shared images of each category are recorded on a record medium such as the CD-R and are sold to the customers.

Here, while the case of sharing the images of the shared image management database 61 with the third party is described, it is also possible to share only the images of a predetermined category with the third party and not to do so as to the images of the other categories.

Moreover, while the image storing server 40 determines whether or not the information on the predetermined category is described in the image attribute information, it may also determine whether or not the information thereon is described in the customer information, for instance.

When the customer selects the predetermined category via the communication terminal unit 20, the image storing server 40 may automatically create the album by performing a predetermined layout in addition to displaying the images belonging to this category. This layout can be modified by the customer. Thus, the customer no longer has to create the album by performing various operations from the beginning so that the time for creating the album can be reduced.

Moreover, in order for a clerk of the mini-lab store to advertise the service contents of this system, it is also possible to check the images of the image information storing database 53 and select the possible best photographs so as to send the printed best photographs to the customer.

On the other hand, the customer management database 62 is comprised of the database wherein the customer information of the image information storing database 53 is classified and arranged.

The image storing server 40 is capable of reading the customer information from the image information storing database 53 and forming the database by classifying the customer information by the same gender, the same generation and the same region, for instance. On the other hand, the image storing server 40 inquires of each customer about whether or not it may be released to the third parties for the sake of direct mail and so on, and adds "release" information indicating whether or not it may be released to the customer management database 62. And the image storing server 40 can select the customers whose "release" is "possible" (the customers who agreed to the release) and send the selected customer information to the third parties. At this time, it is also possible, for instance, to create the customer management database 62 wherein only those whose "release" is "possible" are extracted as shown in FIG. 12.

The point management database 63 is the database wherein the points generated by using each image are accumulated and stored for each customer. As shown in FIG. 13, the point management database 63 is comprised of the reference numbers, customer IDs, point count starting dates and accumulated points. The point count starting date is a starting date of a period for accumulating the points, which should preferably be the date when the customer performed the customer registration for instance. The accumulated points are the points accumulated up to this point in time. And if the predetermined period (such as one year) elapses from the point count starting date, the accumulated points are reset and the points are accumulated from zero again.

The information contents database 64 is comprised of the images classified as to other various kinds of information. For instance, it is comprised of the images classified according to the mini-lab stores, the images arranged in order from the latest update time and date or the images arranged in decreasing order of importance such as frequent access. As mentioned above, the information described in the image attribute information and the customer information may be used for such classification.

Furthermore, the information contents database 64 has the album of each customer. The album referred to here is created by the customer accessing the image storing server 40 via the communication terminal unit 20 and performing editing work in person on the Internet 30. Moreover, when creating the album, the customer can provide a link so that it jumps to the album of a predetermined person if the image displayed on the album is clicked on.

As described above, according to the image storing system 1, it is possible, as the customer stores the image on the image storing server 40, to have the image avoid unexpected circumstances, if any, arising to the customer an unexpected event such as a natural disaster. Furthermore, while storing only the selected and predetermined images for a long period of time, it is possible to efficiently exploit storage capacity of the image storing server 40 by deleting unnecessary images on the other hand.

In addition, according to the image storing system 1, it is possible for the customer to easily search for a desired image since the image attribute information is added to each image in the image information storing database 53.

Moreover, while there was the problem that an old-style image reading apparatus has to be used, if at all, to read the images recorded on an old-style record medium, the image storing system 1 stores the images on the image storing server 40 as opposes thereto, so that it is sufficient to access the image storing server 40 by using a general purpose terminal unit such as the personal computer, and thus the problem in the past can be avoided.

Furthermore, according to the image storing system 1, it is possible to enhance frequency of usage of the customer since the points are provided as the customer receives various services.

Moreover, the present invention is not limited to the above-mentioned embodiments but is applicable to various forms as follows, for instance.

For instance, when accessed by the customer via the communication terminal unit 20, the image storing server 40 can avoid displaying the image mistakenly sent by the customer (a coal-black image or an out-of-focus image, for instance). To be more specific, when requested by the customer not to display the coal-black image, the image storing server 40 calculates an average of luminance signals for each image of the customer, for instance. And then, the image storing server 40 can determine that the images of which average of the luminance signals is smaller than a predetermined value are the coal-black images so as to display the images other than those. In addition, when requested by the customer not to display the out-of-focus image, the image storing server 40 calculates the average of frequency levels for each image of the customer, for instance. And then, the image storing server 40 can determine that the images of which average of frequency levels is smaller than the predetermined value are the out-of-focus images so as to display the images other than those.

Furthermore, the image storing server 40 can display only the images wherein a person is photographed, for instance. When requested by the customer to exclude the images wherein no person is photographed, the image storing server 40 can analyze each image of the customer according to a predetermined algorithm to select the images wherein a person is photographed and display the images selected then.

Thus, if the image storing server 40 has an image analysis algorithm for identifying the predetermined image, it can have only the predetermined image displayed from the image information storing database 53 or display the images other than the predetermined image.

In addition, the image storing server 40 can exploit the clock function provided to the control division 44 to provide the information according to each customer. Here, the image storing server 40 searches the image attribute information and the customer information of the image information storing database 53 to extract the information on the events such as a birthday, Shichigosan (Japanese celebration for children of three, five and seven years of age), a coming-of-age ceremony, a wedding and a Buddhist service. Next, the image storing server 40 adds the extracted information on the events and the dates thereof to the image information storing database 53 for each customer.

And when the current date precedes the event described in the image information storing database 53 by the predetermined period, the image storing server 40 sends to the customers the e-mail suggesting that the event is drawing near. Moreover, the direct mail may be mailed based on the addresses described in the customer information instead of the e-mail.

As an example, the image storing server 40 can extract 19-year-old customers from the customer information of the image information storing database 53 so as to send photograph service information for the coming-of-age ceremony a few months before the ceremony. In addition, the image storing server 40 may also extract information on weddings and the dates thereof from the image attribute information of the image information storing database 53 so as to send to the customer the photograph service information for the first wedding anniversary at the time preceding the first wedding anniversary by the predetermined period.

Furthermore, the image storing server 40 can send the image designated by the customer to the location and the record medium or the recorder designated by the customer. For instance, the customer accesses the image storing server 40 via the communication terminal unit 20, and operates the mouse 22 and the keyboard 23 to send image output destination information for identifying the image in the image information storing database 53, and furthermore an output location of the image (the mini-lab store in the neighborhood of the customer, for instance) and the record medium for recording the image (the CD-R, a memory card, paper and so on, for instance). The image storing server 40 reads the image from the image information storing database 53 based on the image output destination information from the communication terminal unit 20, and sends it to a laser printer installed in the mini-lab store designated by the customer. As a result of it, the customer can go to the mini-lab store in the neighborhood and obtain the image that is printed out.

In addition, when accessed by the customer via the communication terminal unit 20, the image storing server 40 can also count the frequency of access and measure access time for each image so as to describe the frequency of access and the access time on the image information storing database 53. And when accessed by the customer via the communication terminal unit 20 again, the image storing server 40 can perform an index display of the predetermined number of images frequently accessed or the predetermined number of images accessed for a long time. Thus, the image storing server 40 can automatically set an operating environment according to the customer each time the customer accesses it.

Moreover, while the image storing database 51, the customer information database 52 and the image information storing database 53 are stored in the image storing server 40 in this embodiment, they may be distributed in different servers. In addition, the image storing database 51 and the image information storing database 53 can be the same.

Furthermore, it is also possible to associate a dynamic image with a static image in the image information storing database 53. At this time, the address indicating a storing destination of the dynamic image and so on should be described in the image attribute information of the static image.

Figure 14:
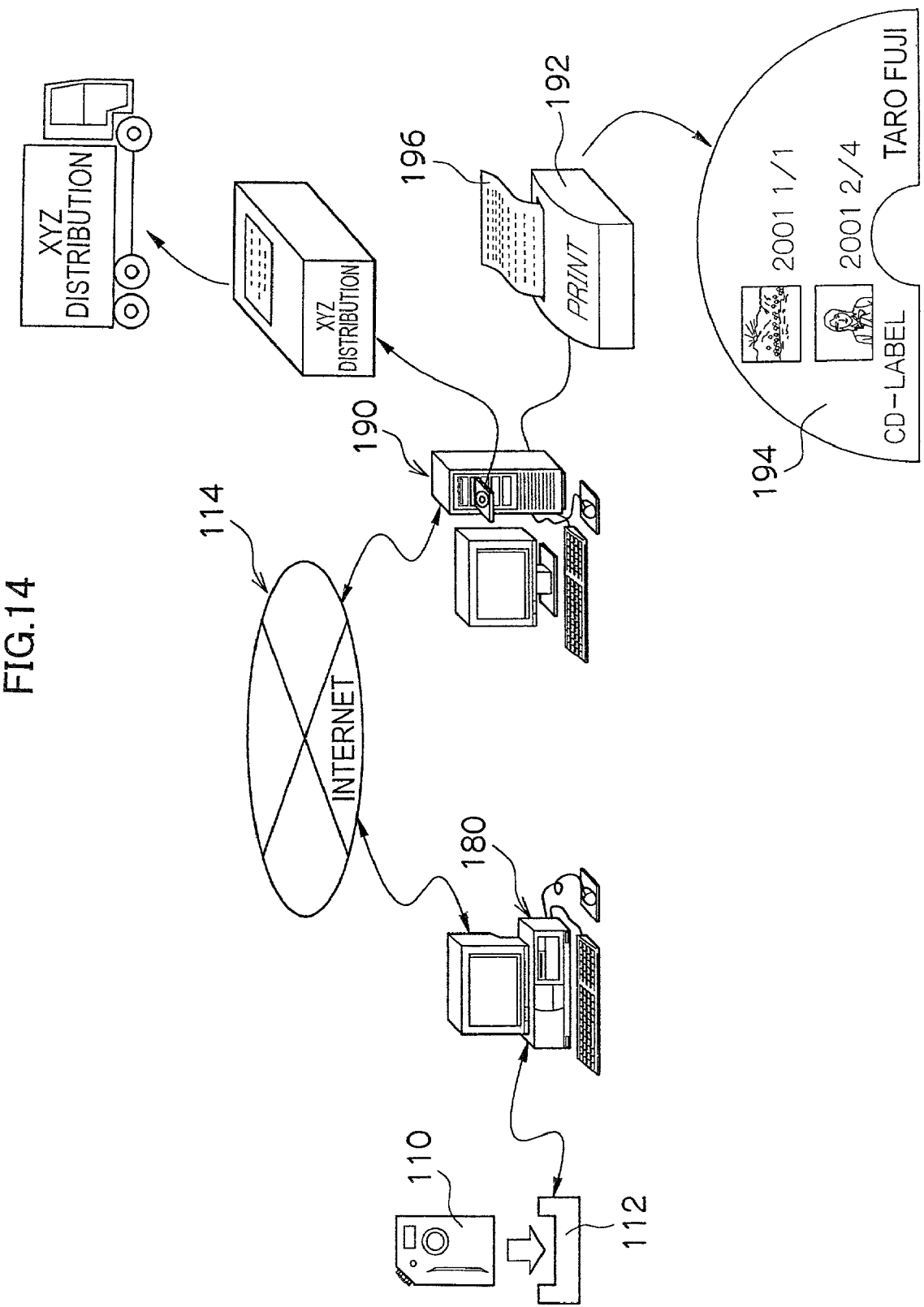
FIG. 14 is a block diagram of the image storing system including the image storing apparatus.

FIG. 14 is a block diagram of another embodiment of the image storing system including the image storing apparatus (image storing server) according to the present invention.

As shown in this drawing, the image storing system has, as provided on the customer side thereof, a digital camera 110 with which the customer photographs the image, a cradle 112 for mounting the digital camera 110 and communication-connecting the digital camera 110 to a customer-side personal computer 180, and the customer-side personal computer 180 capable of obtaining the image from the digital camera 110 via the cradle 112 and also sending the obtained image to a server 90 via a communication network 114 such as the Internet.

In addition, the image storing system has the communication network 114 such as the Internet, a server 190 (image storing server) capable of sending and receiving the information including the image to and from the customer-side personal computer 180 and so on via the communication network 114 and storing the image received from the customer's side. The server 190 has a printing device 192, which prints a name of the image or a reduced image and so on as a list 196 or as a label 194 to be affixed to the above described storage medium and so on connected thereto.

Figure 15:
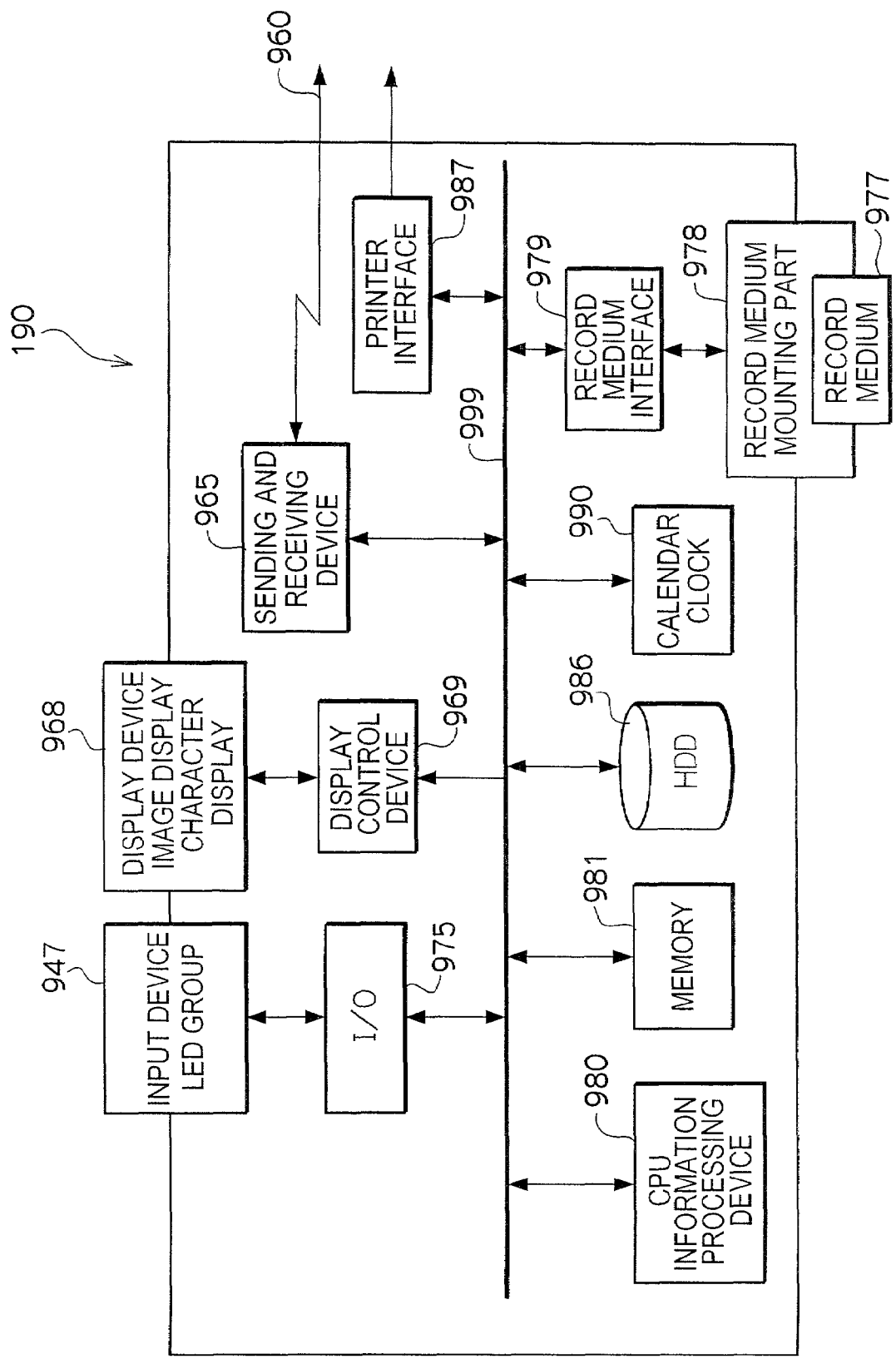
FIG. 15 is a signal processing system block diagram of the server.

FIG. 15 shows a signal processing system block diagram of the server 190.

According to this diagram, an information sending and receiving division of the server 190 has a sending and receiving device 965 for a public circuit, which sends and receives the information to and from other communication apparatuses (the personal computer 180, the digital camera 110 and so on) via a public circuit 960 or the communication network 114 such as a telecommunication network provided therein.

In addition, the server 190 has a display 968 which displays the information such as the image and the characters as necessary for confirmation, a display control device 969, which outputs an image signal for display to the display 968 based on a command of an information processing device, and an I/O (Input-Output) 975 for reading various kinds of information inputted by an administrator via an input device 974, conveying it to the information processing device mentioned later and outputting a display command to a notification device such as an LED based on an instruction from the information processing device.

Moreover, the server 190 has a record medium mounting division 978 for removably mounting a record medium 977 and a record medium interface 979 for recording and reading the information such as the image data on the record medium 977. Moreover, the record medium 977 is a removable record medium represented by magnetic recording, optical recording and so on represented by a semiconductor such as a memory card, a Zip, an MO (Magneto Optical Disk) and so on.

In addition, the server 190 has an information processing device (CPU: Central Processing Unit) 980, which controls the entire server 190, a memory 981 comprised of a ROM (Read Only Memory) in which a program for operating the CPU 980 and various constants are recorded and a RAN (Read Access Memory), which is a recording device as a work area for the CPU 980 to perform processing, a recording device 986 such as a hard disk for recording various constants on the processing of the server 190, its attribute information on the network, connection information such as URL (Uniform Resource Locators), addresses, site addresses and gateway information DNS (Domain Name System), and the image sent from the customer side, a banner advertisement of which distribution is requested by an advertisement distribution requester, a printer interface 987 for sending printing information to the printing device 192, and a calendar clock 990 for indicating time.

The CPU 980 in the server 190, the display control device 969, the I/O 975, the memory 981, the recording device 986 peripheral circuits including, the calendar clock 990 and so on are connected by a bus 999, and the CPU 980 can control the respective peripheral circuits.

Storing and management of the image are described hereafter.

If the customer photographs a desired image by operating the digital camera 110 and mounts the camera on the cradle 112, the information that the digital camera 110 was connected is conveyed to the personal computer 180, and software of an image viewer having a function of browsing the photographed image and automatically uploading the image on the server 190 is automatically started.

If the software of the image viewer is automatically started on the personal computer 180, the personal computer 180 automatically obtains the images recorded on the recording device of the digital camera 110 and unique information such as identification information of the digital camera 110 and information on the store where the digital camera 110 was purchased, and displays the obtained images as a list on the display of the personal computer 180, and sends the image data and the above described unique information to the server 190 via the communication network 114 such as the Internet. Moreover, as for sending of the images to the server 190, it is also feasible that the customer selects the image to be sent and provides an instruction to send it to the server 190. In addition, it is also feasible to adopt a method of, before sending it, obtaining transmitted image information from the server side and determining in advance whether or not to send it.

The above described image and unique information are received by the sending and receiving device 965 of the server 190. The CPU 980 or the recording device 986 reads the information on a file name of the image of a specific customer and a photographing date thereof recorded on the recording device 986, and compares it to the file name of the image and so on received from the personal computer 180. And in the case where it determines that the file name of the image received from the personal computer 180 and those recorded on the recording device 986 are the same, it does not duplicately record the same image as that already recorded on the recording device 986. Accordingly, it only records on the recording device 986 the images of which file name and so on received from the personal computer 180 are different from those recorded on the recording device 986.

In addition, predetermined limit capacity such as 50 MB per customer is given to the above described recording device 986. Accordingly, the CPU 980 or the recording device 986 first reads and totals the capacity of the images of the specific customer recorded on the recording device 986. In the case where the above described totaled capacity of the images does not exceed the predetermined limit capacity, the image received from the personal computer 180 is recorded as-is on the recording device 986.

Moreover, in the case of recording the image received from the personal computer 180 on the recording device 986, if the CPU 980 determines that the images of the specific customer recorded on the recording device 986 will exceed the predetermined limit capacity, the CPU 980 moves one or a plurality of images recorded thereon to the record medium 977. In the case where the record medium 977 is a CD-R, the CPU 980 creates CD write data including the images, and then writes the created write data to the CD-R. Moreover, the record medium may also be a printout of the image itself other than an electronic medium such as the CD-R.

In addition, in the case of recording the image received from the above described personal computer 180 on the recording device 986, if the CPU 980 determines that the images of the specific customer recorded on the recording device 986 will exceed the predetermined limit capacity, the CPU 980 may also send the information that the predetermined limit capacity will be exceeded to the customer-side personal computer 180.

In the case where, as a result of sending the information to the effect that the above described limit capacity will be exceeded, image movement acknowledgement information for acknowledging that the images will be moved from the recording device 986 to the record medium 977 or payment information for paying a purchase price of the record medium 977 having recorded the moved images is received from the customer-side personal computer 180 (communication apparatus), it is also feasible that the CPU 980 moves to the record medium 977 the image movement acknowledgement information or the payment information received from the customer-side communication apparatus and the images of the specific customer recorded on the recording device 986 based on the result of the determination.

Moreover, the above described CPU 980 may also read and total recording capacity of the images of the specific customer recorded on the recording device 986 so as to compare it to a threshold of predetermined recording capacity (40 MB, 50 MB, etc.). For instance, in the case where the limit capacity is 50 MB and the recording capacity of the image of the specific customer has already exceeded 40 MB, the CPU 980 sends to the customer-side personal computer 180 via the sending and receiving device 965 the information for notifying the specific customer that the remaining allowable recording capacity is within 10 MB.

And in the case where the sending and receiving device 965 receives from the customer-side communication apparatus the image movement acknowledgement information for acknowledging that the images will be moved from the recording device to the record medium, the CPU 980 may move the images of the specific customer recorded on the recording device 986 to the record medium 977 based on various determination results.

Moreover, while the condition for moving the images recorded on the recording device 986 to the record medium 977 was described by taking the case of using the limit capacity of the images as an example in the above description, the present invention is not limited to this limit capacity, and it is also possible to attain the object of the present invention by moving the images recorded on the recording device 986 to the record medium 977 based on the determination results of whether or not the recording period of the images recorded on the recording device 986 passed the predetermined period (threshold), whether or not the quantity of the images recorded on the recording device 986 exceeded the predetermined quality (threshold), or whether or not the current date passed the predetermined date (threshold) (in the case of periodically moving the images to the record medium 977 such as once a month or once a year).

In addition, the CPU 980 reads the information on the file name and the photographing date of the image of the specific customer recorded on the recording device 986 and the record medium 977 so as to compare them. And it is also feasible, if it determines that the file name and so on of the image recorded on the recording device 986 and those recorded on the record medium 977 are the same, to avoid duplicately moving the same image as that already recorded on the record medium 977.

Accordingly, in this case, the CPU 980 moves to the record medium 977 only the images of which file name and so on recorded on the record medium 977 are different from those recorded on the recording device 986.

Moreover, in the case where a request as to a type of the record medium at the destination of the above described images to be moved (record medium type information) is received from the customer-side personal computer 180 via the sending and receiving device 965, the CPU 980 moves the images to the record medium 977 of the type based on the received record medium type information.

In addition, the server 190 has the printing device 192 provided thereon, which creates a label data wherein the name of the image or the reduced image (thumb-nail image), first and last dates of a recorded image and so on recorded on the record medium 977 are converted into a predetermined printing format, and prints it as the list 196 or on the label 194 to be affixed to the record medium 977. Moreover, the printed label 194 is affixed to the record medium 977.

Moreover, the sending and receiving device 965 of the server 190 outputs to a delivery device an instruction to deliver the record medium 977 to the customer side based on the customer's request. In addition, it is also feasible to output the printing information of an invoice indicating a delivery destination to the printing device 192 via the printer interface 987 so as to print the invoice and affix it to a delivery package of the record medium 977.

If the delivery device receives the instruction to deliver the record medium 977 from the sending and receiving device 965, it delivers the record medium 977 having recorded the images to the customer side. It is possible, for the customer having obtained the record medium 977, to browse the images recorded thereon by mounting the record medium 977 on the customer-side personal computer 180 and so on.

As described above, according to the present invention, it is possible, by storing the image management information associating the image stored in the image storing device and indicated by the image selection information with the customer information stored in the customer information storing device, to store the image in a state where it can be easily searched for and classified and protect the image from unexpected circumstances, if any, arising to the customer.

In addition, it is possible to search for and classify a desired image more easily by associating the image attribute information with the image management information. Furthermore, it is possible, when no image attribute information or image selection information is received after the predetermined period elapsed, to delete the image from the image storing device so as to render storage capacity of the database more efficient.

Furthermore, if the capacity, storing period, current date or stored quantity of the images of a certain customer exceeds the predetermined threshold, one image or a plurality of images of the customer are moved to another medium so as to secure the storage capacity of the image storing device.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image storing apparatus, comprising:
   an image capturing device configured to capture an image;
   an image storing device configured to store the image captured by the image capturing device;
   a customer information storing device configured to store customer information;
   a receiving device configured to receive image selection information indicating that the stored image stored in the image storing device is selected to remain stored and not removed from the image storing device;
   an image management information storing device configured to store image management information associating the image stored in the image storing device and indicated by the image selection information received by the receiving device with the customer information stored in the customer information storing device; and
   an image deleting device configured to delete the stored image in the image storing device when the image selection information is not received.

2. The image storing apparatus according to claim 1, wherein:
   the receiving device receives image attribute information indicating an attribute of the image as one piece of the image selection information; and
   the image management information storing device stores the image stored in the image storing device and indicated by the image attribute information received by the receiving device by associating the image with the image attribute information and the customer information stored in the customer information storing device.

3. The image storing apparatus according to claim 1, wherein the image storing device and the image management information storing device are the same database.

4. The image storing apparatus according to claim 1, further comprising:
   an image storing period measuring device configured to measure a storing period of the image; and
   a notifying device configured to, when the storing period measured by the image storing period measuring device passes a predetermined period, notify the customer of the image so as to prompt input of one of the image selection information and image attribute information.

5. The image storing apparatus according to claim 4, wherein when the receiving device receives none of the image selection information and the image attribute information within the predetermined period from the notification, the image deleting device deletes the image which is a subject of the notification.

6. The image storing apparatus according to claim 1, further comprising:
   a usage charge calculating device configured to calculate a usage charge according to a using area and a storing period of the image stored in the image storing device; and
   a usage charge notifying device configured to notify the customer of the usage charge calculated by the usage charge calculating device.

7. The image storing apparatus according to claim 6, wherein, in the case where a charge is not paid within a predetermined period after the notice of the usage charge is given by the usage charge notifying device, at least one of the image storing device and the image management information storing device prohibits the customer in arrears from getting access.

8. The image storing apparatus according to claim 7, further comprising:
   a point calculating device configured to calculate points according to a storing area and a storing period of the image stored in the image storing device; and
   a point storing device configured to accumulatively store the points calculated by the point calculating device for each customer.

9. The image storing apparatus according to claim 1, further comprising:
   a receiving device configured to receive customer reading authorization information indicating that the customer has authorized the customer information to be read; and
   a sending device configured to read the customer information corresponding to the customer reading authorization information received by the receiving device from the customer information storing device and send the read customer information to another customer.

10. The image storing apparatus according to claim 1, further comprising:
    a receiving device configured to receive image usage authorization information authorizing usage of the image,
    wherein at least one of the image storing device and the image management information storing device authorizes a third party to access the image indicated by the image usage authorization information received by the receiving device and prohibits the third party from accessing any information other than the image indicated by the received image usage authorization information.

11. The image storing apparatus according to claim 1, further comprising:
    a classified information storing device configured to store classified information having classified the images stored in the image storing device according to at least one of the customer information and the image attribute information; and
    a receiving device configured to receive classified reading authorization information authorizing the images belonging to a predetermined classification to be read,
    wherein at least one of the image storing device and the classified information storing device authorizes a third party to access the image belonging to the classification indicated by the classified reading authorization information received by the receiving device and prohibits the third party from accessing any image belonging to any classification other than the one indicated by the received classified reading authorization information.

12. The image storing apparatus according to claim 1, further comprising:
   a date timing device configured to time the current date;
   an event analyzing device configured to analyze an event related to the customer based on at least one of the customer information and the image attribute information stored in the image management information storing device; and
   an event notifying device configured to, when the current date timed by the date timing device is within a predetermined period before the date of the event analyzed by the event analyzing device, give notice of the event analyzed by the event analyzing device.

13. The image storing apparatus according to claim 1, further comprising:
   a receiving device configured to image output destination information identifying the image, an output location of the image and a record medium for the image; and
   a sending device configured to read the image identified by the image output destination information from the image storing device based on the image output destination information received by the receiving device, and send the read image to a record medium recording apparatus placed in an output location identified by the image output destination information and recording data on the record medium indicated by the image output destination information.

14. An image storing system, comprising:
   a plurality of terminal units, each of which comprises:
      an image selecting device configured to select the image to be stored; and
      a sending device configured to send the image selected by the image selecting device and image selection information indicating the image; and
   an image storing apparatus comprising:
      an image capturing device to capture the image sent from the terminal unit;
      an image storing device configured to store the image captured by the image capturing device;
      a customer information storing device configured to store customer information;
      a receiving device configured to receive image selection information sent from the terminal unit indicating that the image stored in the image storing device is selected to remain stored and not removed from the image storing device;
      an image management information storing device configured to store image management information associating the image stored in the image storing device and indicated by image selection information received by the receiving device with the customer information stored in the customer information storing device; and
      an image deleting device configured to delete the stored image in the image storing device when the image selection information is not received.

15. The image storing system according to claim 14, wherein:
   the sending device of the terminal unit sends image attribute information indicating an attribute of the image as one piece of the image selection information;
   the receiving device of the image storing apparatus receives the image attribute information from the terminal unit as one piece of the image selection information; and
   the image management information storing device of the image storing apparatus stores the image stored in the image storing device and indicated by the image attribute information received by the receiving device by associating the image with the image attribute information and the customer information stored in the customer information storing device.

16. The image storing system according to claim 14, wherein the image storing apparatus further comprises:
   an image storing period measuring device configured to measure a storing period of the image; and
   a notifying device configured to, when the storing period measured by the image storing period measuring device passes a predetermined period, notify the customer of the image so as to prompt input of at least one of the image selection information and image attribute information.

17. The image storing system according to claim 16, wherein when the receiving device receives none of the image selection information and the image attribute information within the predetermined period from the notification, the image deleting device deletes the image which is a subject of the notification.

18. The image storing system according to claim 14, wherein the image storing apparatus further comprises:
   a calculating device configured to calculate a usage charge according to a storing area and a storing period of the image stored in the image storing device; and
   a notifying device configured to notify the customer of the usage charge calculated by the calculating device.

19. The image storing system according to claim 18, wherein, in the case where a charge is not paid within a predetermined period after the notice is given by the usage charge notifying device, at least one of the image storing device and the image management information storing device of the image storing apparatus prohibits the customer in arrears from getting access.

20. The image storing system according to claim 19, wherein the image storing apparatus further comprises:
   a point calculating device configured to calculate points according to a storing area and a storing period of the image stored in the image storing device; and
   a point storing device configured to accumulatively store the points calculated by the point calculating device for each customer.

21. The image storing system according to claim 14, wherein:
   the terminal unit further comprises:
      an input device configured to input customer reading authorization information indicating that the customer has authorized the customer information to be read; and
      a sending device configured to send the customer reading authorization information inputted by the input device; and
   the image storing apparatus further comprises:
      a receiving device configured to receive the customer reading authorization information sent from the terminal unit; and
      a sending device configured to read customer information indicated by the customer reading authorization information received by the receiving device and send the read customer information to another customer.

22. The image storing system according to claim 14, wherein:
the terminal unit further comprises:
an input device configured to input image usage authorization information indicating usage authorization of the image; and
a sending device configured to send the image usage authorization information inputted by the input device; and
the image storing apparatus further comprises a receiving device configured to receive the image usage authorization information sent from the terminal unit; and
at least one of the image storing device and the image management information storing device authorizes a third party to access the image indicated by the image usage authorization information received by the receiving device and prohibits the third party from accessing any image other than the image indicated by the image usage authorization information.

23. The image storing system according to claim 14, wherein:
the image storing apparatus further comprises:
a classified information storing device configured to store classified information having classified the images stored in the image storing device according to at least one of the customer information and the image attribute information; and
a receiving device configured to receive classified reading authorization information authorizing the images belonging to a predetermined classification to be read; and
at least one of the image storing device and the classified information storing device authorizes a third party to access the image belonging to the classification indicated by the classified reading authorization information received by the receiving device and prohibits the third party from accessing any image belonging to any classification other than the one indicated by the received classified reading authorization information.

24. The image storing system according to claim 14, wherein:
the image storing apparatus further comprises:
a date timing device configured to time the current date;
an event analyzing device configured to analyze an event related to the customer based on at least one of the customer information and the image attribute information stored in the image management information storing device; and
an event notifying device configured to, when the current date timed by the date timing device is within a predetermined period before the date of the event analyzed by the event analyzing device, give notice of the event analyzed by the event analyzing device.

25. The image storing system according to claim 14, wherein:
the terminal unit further comprises:
an input device configured to input image output destination information identifying the image, an output location of the image and a record medium for the image; and
a sending device configured to send the image output destination information inputted by the input device; and
the image storing apparatus further comprises:
a receiving device configured to receive the image output destination information sent from the terminal unit; and
an image sending device configured to read the image identified by the image output destination information from the image storing device based on the image output destination information received by the receiving device, send the read image to a record medium recording apparatus placed in an output location identified by the image output destination information and record data on the record medium indicated by the image output destination information.

26. The image storing system according to claim 14, wherein:
the terminal unit further comprises:
an image reading device configured to read the image recorded on a film;
an image processing device configured to perform predetermined image processing to the image read by the image reading device; and
a printing device configured to print the image image-processed by the image processing device; and
the image sending device sends the image image-processed by the image processing device to the image storing apparatus.

27. A terminal unit, comprising:
an image selecting device configured to select an image to be stored; and
a sending device configured to send the image selected by the image selecting device to a storage device, separate from the terminal unit, together with image selection information indicating that the stored image is selected to remain stored and not removed from the storage device.

28. The terminal unit according to claim 27, wherein the sending device sends image attribute information indicating an attribute of the image as one piece of the image selection information.

29. The terminal unit according to claim 27, further comprising:
an input device configured to input customer reading authorization information indicating that the customer has authorized the customer information to be read; and
a sending device configured to send the customer reading authorization information inputted by the input device.

30. The terminal unit according to claim 27, further comprising:
an input device configured to input image usage authorization information indicating usage authorization of the image; and
a sending device configured to send the image usage authorization information inputted by the input device.

31. The terminal unit according to claim 27, further comprising:
an input device configured to input output destination information identifying the image, an output location of the image and a record medium for the image; and
a sending device configured to send the image output destination information inputted by the input device.

32. The terminal unit according to claim 27, further comprising:
an image reading device configured to read the image recorded on a film;

an image processing device configured to perform predetermined image processing to the image read by the image reading device; and a printing device configured to print the image image-processed by the image processing device, wherein the sending configured to send the image image-processed by the image processing device.

33. An image storing apparatus having a recording device which records an image uploaded from a customer side, the apparatus comprising:

a receiving device configured to receive the image from a communication apparatus on the customer side;

a recording device configured to record the received image;

a determining device configured to determine whether or not to move the image recorded on the recording device to a record medium by comparing at least one of the capacity, quantity, recording period and a current date thereof recorded on the recording device to corresponding at least one of predetermined thresholds; and a moving device configured to move the image recorded on the recording device to the record medium based on results of the determination.

34. The image storing apparatus according to claim 33, wherein:

the receiving device receives from a customer-side communication apparatus image movement acknowledgement information for acknowledging the images to be moved from the recording device to the record medium; and the moving device moves the image recorded on the recording device to the record medium based on the image movement acknowledgement information received from the customer-side communication apparatus and the determination results.

35. The image storing apparatus according to claim 33, wherein:

the receiving device receives from the customer-side communication apparatus payment information for paying a purchase price of the record medium having recorded the moved image; and the moving device moves the image recorded on the recording device to the record medium based on the payment information received from the customer-side communication apparatus and the determination results.

36. The image storing apparatus according to claim 33, wherein:

the receiving device receives from the customer-side communication apparatus record medium type information for identifying the type of the record medium; and the moving device moves the image recorded on the recording device to the identified record medium based on the record medium type information received from the customer-side communication apparatus.

37. The image storing apparatus according to claim 33, further comprising a printing device configured to print at least one of a name of the image and a reduced image recorded on the record medium on at least one of a list and a label to be affixed to the record medium.

38. The image storing apparatus according to claim 33, further comprising a delivery device configured to deliver the record medium to the customer side.

39. The image storing apparatus according to claim 33, wherein the recording device does not record an image that is a duplicate of an image that is already recorded on the recording device.

40. The image storing apparatus according to claim 33, wherein the moving device does not move an image that is a duplicate of an image that has already been moved to the record medium.

41. A computer program product comprising a recording medium having encoded thereon a computer readable program executable by an information processing device of an image storing apparatus to carry out the operations of:

receiving an image at a receiving device of the image storing apparatus from a customer-side communication apparatus;

determining, by a determining device of the image storing apparatus, whether or not to move the image recorded on the recording device to a record medium by comparing at least one of capacity, quantity, a recording period and a current date thereof recorded on the recording device to at least one of corresponding predetermined thresholds; and moving, by a moving device of the image storing apparatus, the image recorded on the recording device to the record medium based on results of the determination.

42. An image storing method comprising:

receiving the image from a customer-side communication apparatus;

recording the received image on a recording device;

determining whether or not to move the image recorded on the recording device to a record medium by comparing at least one of capacity, quantity, recording period and a current date thereof recorded on the recording device to corresponding one of predetermined thresholds; and moving the image recorded on the recording device to the record medium based on results of the determination.

* * * * *